(12) United States Patent
Volokh

(10) Patent No.: US 8,142,119 B2
(45) Date of Patent: Mar. 27, 2012

(54) METHOD OF ORBITAL MILLING WITH AN ORBITAL END MILL, AN ORBITAL END MILL, AND A CUTTING BIT FOR AN ORBITAL END MILL

(75) Inventor: Vladimir Volokh, Ma'alot (IL)

(73) Assignee: Hanita Metal Works Ltd, Shlomi (IL)

( * ) Notice: Subject to any disclaimer, the term of this patent is extended or adjusted under 35 U.S.C. 154(b) by 1207 days.

(21) Appl. No.: 11/864,035

(22) Filed: Sep. 28, 2007

(65) Prior Publication Data

US 2008/0069656 A1    Mar. 20, 2008

Related U.S. Application Data

(63) Continuation-in-part of application No. PCT/IL2006/000299, filed on Mar. 5, 2006.

(30) Foreign Application Priority Data

Mar. 31, 2005    (IL) .................................... 167779

(51) Int. Cl.
*B23C 3/00*    (2006.01)
*B23C 5/10*    (2006.01)
(52) U.S. Cl. ............ 409/132; 407/53; 408/30; 408/222; 409/66; 409/74
(58) Field of Classification Search .......... 409/131–132, 409/65–66, 74, 78; 407/29, 31, 53, 54, 55, 407/61–63; 408/22, 24, 30, 224, 222
See application file for complete search history.

(56) References Cited

U.S. PATENT DOCUMENTS

| | | | |
|---|---|---|---|
| 2,145,819 A * | 1/1939 | Swenson | 408/222 |
| 3,526,167 A | 9/1970 | Escobedo | |
| 4,761,844 A * | 8/1988 | Turchan | 470/199 |
| 4,831,674 A * | 5/1989 | Bergstrom et al. | 470/199 |

(Continued)

FOREIGN PATENT DOCUMENTS

DE    3627798 A1 *    2/1988

(Continued)

OTHER PUBLICATIONS

English translation of International Search Report PCT/IL06/00299.

(Continued)

*Primary Examiner* — Daniel Howell
(74) *Attorney, Agent, or Firm* — Larry R. Meenan

(57) ABSTRACT

A method of orbital milling is performed using an orbital end mill, which has a cutting bit designed for orbital end milling. The abstract of the disclosure is submitted herewith as required by 37 C.F.R. §1.72(b). As stated in 37 C.F.R. §1.72 (b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

18 Claims, 7 Drawing Sheets

U.S. PATENT DOCUMENTS

| | | | |
|---|---|---|---|
| 4,930,949 A * | 6/1990 | Giessler | 408/222 |
| 4,943,191 A * | 7/1990 | Schmitt | 408/1 R |
| 5,080,538 A * | 1/1992 | Schmitt | 409/66 |
| 5,143,492 A | 9/1992 | Leeb | |
| 5,429,459 A * | 7/1995 | Palm | 409/66 |
| 5,678,962 A | 10/1997 | Hyatt et al. | |
| 5,727,910 A | 3/1998 | Leeb | |
| 5,733,078 A * | 3/1998 | Matsushita et al. | 409/74 |
| 5,944,462 A | 8/1999 | Woodward | |
| 6,007,281 A * | 12/1999 | Eriksson et al. | 409/132 |
| 6,012,882 A * | 1/2000 | Turchan | 409/74 |
| 6,193,446 B1 | 2/2001 | Astrom et al. | |
| 6,257,810 B1 * | 7/2001 | Schmitt | 409/66 |
| 6,439,811 B1 | 8/2002 | Wardell | |
| 6,663,326 B1 * | 12/2003 | Hiroyasu et al. | 408/144 |
| 6,846,135 B2 | 1/2005 | Kuroda et al. | |
| 6,869,259 B2 * | 3/2005 | Lebkuechner | 409/132 |
| 2010/0172703 A1 * | 7/2010 | Neubold | 407/53 |

FOREIGN PATENT DOCUMENTS

| | | | |
|---|---|---|---|
| DE | 3808797 A * | 10/1989 | |
| DE | 3934907 A1 * | 4/1991 | |
| DE | 4010075 A1 * | 10/1991 | |
| DE | 44 40 567 A1 | 5/1995 | |
| DE | 19834039 A1 * | 2/1999 | |
| EP | 0 432 621 A2 | 6/1991 | |
| JP | 53 085 793 U | 7/1978 | |
| JP | 2000 141121 A | 5/2000 | |
| JP | 2001113407 A * | 4/2001 | |
| JP | 2004188516 A | 7/2004 | |
| WO | WO 2004022274 A1 * | 3/2004 | |

OTHER PUBLICATIONS

Supplementary European Search Report EP 06 71 1281.

* cited by examiner

METHOD OF ORBITAL MILLING WITH AN ORBITAL END MILL, AN ORBITAL END MILL, AND A CUTTING BIT FOR AN ORBITAL END MILL

CONTINUING APPLICATION DATA

This application is a Continuation-In-Part application of International Patent Application No. PCT/IL2006/000299, filed on Mar. 5, 2006, which claims priority from Israel Patent Application No. 167779, filed on Mar. 31, 2005. International Patent Application No. PCT/IL2006/000299 was pending as of the filing date of this application. The United States was an elected state in International Patent Application No. PCT/IL2006/000299.

BACKGROUND

1. Technical Field

This application relates to a method of orbital milling with an orbital end mill. This application further relates to an orbital end mill and a cutting bit for an orbital end mill.

2. Background Information

End-mills are widely used in milling operations due to their versatile range of application and due to the moderate first cost of the tool. End-mills are often of cylindrical shape, and are available up to about 80 mm diameter. Many end mills have flat ends, however other shapes such as conical and rounded ends are also used. An end-mill typically has 2 to 10 teeth, depending on diameter, size and whether configured for rough cutting or finishing. Teeth are usually of spiral shape, but can be straight parallel to the axis. Material of construction is high speed steel, solid carbide, cermets or ceramic, or combinations thereof.

In the following text the words "end mill" refer to a cutter made of steel or of hard ceramic materials or combinations thereof, whether the cutter is plated with a hard coating or not. Also, the term "milling machine" as used in the present text is to be interpreted as also including other suitable machine tools, such as lathes, borers and heavy duty drilling machines.

An end mill normally held in a milling machine will, when fed into a work piece, produce a hole or recess of a diameter corresponding to the diameter of the cutting teeth of said end mill. However, where desired, it is possible to machine a hole of a size larger than the diameter of the end mill by mounting the end mill on a tool holder in a manner where the axis of the milling machine spindle and the axis of the end mill are spaced apart and parallel. This fixed orbital circle is, however, of limited use. Using a modern CNC milling machine, the end mill can be mounted normally and variable orbital movement is available, as needed, for example, for the machining of tapered holes. This orbital arrangement has been found to be particularly useful for the machining of blind holes and for the machining of female screw threads.

To further explain, orbital milling, which may sometimes be referred to as planetary milling, involves the movement of a milling head or bit along a circular or substantially circular path, or possibly other paths. Specifically, the central rotational axis of the milling head or bit revolves about and a distance away from another central axis, such as the central axis of a machine tool or the central axis of the hole being machined. Orbital milling permits the milling of a hole having a size or diameter that is greater than the greatest diameter of the milling or cutting head, often approximately double the size of the milling head. In operation, the milling head rotates about its central rotational axis while the entire milling head is moved, such as by a CNC tool holder, in an orbiting or revolving manner along a circular or substantially circular path, or possibly other paths, about another axis, such as the center axis of the hole. Often the direction of rotation of the milling head is opposite the direction of revolution, i.e. the milling head rotates in a clockwise direction while it is moved along a path in a counter-clockwise direction. Orbital milling not only permits the milling of larger holes with a smaller milling head, the increased space between the walls of the hole being cut and the perimeter cutting edges or surfaces or teeth of the milling head also promotes good chip flow and removal of chips and thus decreases the chances for jamming or even sticking of the milling head in the hole.

As is known, the tool cutting angles for rough machining requiring maximum rates of metal removal are different from the optimum tooth shape for finish machining where small amounts of metal are removed but a good surface finish is required. Obviously, it is possible to change the end mill on completion of rough machining and again exchange the end mill to machine the next component, or to rough machine a batch which is later finish machined. Neither option is desirable, as much time is lost either on tool changing or on work piece reclamping. For this reason double-purpose tools have been developed where an end mill or other tool carries at least one tooth for rough machining and a second tooth for finishing.

In U.S. Pat. No. 5,727,910, Leeb discloses a cutting tool including an insert having a plurality of cutting edges of inwardly directed V shaped geometry. The insert has inner and outer flank cutting edges with rounded corners. The cutting edge is divided into by a chisel edge into roughing and finishing cutting portions.

Two known problems, with regard to screw-on inserts, are that high precision in positioning the insert is required to avoid over-size holes, and the screw holding the insert has a tendency to loosen due to vibration of the tool when in use. Yet a further problem regarding tools using two inserts is that high precision is indispensable in the settings of the two inserts which need to be identical. Due to the size of the insert, which must be large enough to allow setting and clamping, small and medium size holes can not be machined.

A somewhat similar insert is described by Aström et al. in U.S. Pat. No. 6,193,446 B1. On side surfaces, a clearance surface formed on a protruding portion which, via a step clearance, extends into a secondary helically twisted clearance surface, the chip angle of which increases with increasing cutting depth. The insert includes a chip breaker.

Wardell, in U.S. Pat. No. 6,439,811 B1, claims an end mill wherein at least one flute defines a low angle cutting surface while a second flute has a high angle cutting surface. The two flutes intersect to form a compound cutting surface.

Kuroda et al. disclose a flat-bottom end mill with rounded corners in U.S. Pat. No. 6,846,135 B2. The corner configuration described is claimed to improve resistance to chipping and fracture of the end mill.

OBJECT OR OBJECTS

It is therefore one of the objects of the present application to provide an end mill for orbital milling. It is a further object of the present application to improve the surface finish of machined, circular-section recesses by the provision of at least one semi-finishing cutting section. Yet a further aim of the present application is to provide an end mill capable of orbital machining a 3-5 mm and/or larger diameter hole.

SUMMARY

The present application achieves the above objects by providing an orbital milling tool for cutting openings in a solid material, wherein said openings include normal cylindrical through holes, blind holes, holes including recesses, screw threaded holes, tapered holes and double tapered holes. The tool has a shank portion adjoining a cutting portion, the axis of which cutting portion is spaced apart from the spindle axis of a machine tool in which the shank is to be held. The cutting portion has a plurality of roughing cutting edges, a plurality of semi-finishing edges axially spaced apart by means of a first transition section from the roughing cutting edges, and a plurality of finishing edges axially spaced apart by means of a second transition section from the semi-finishing cutting edges. The maximum diameter of the semi-finishing edges is larger than the maximum diameter of the roughing cutting edges and smaller than minimum diameter of the finishing edges.

At least one possible embodiment of the present application allows for the machining of complex hollows using a CNC milling machine. Furthermore, as the machining pressure is divided along an extended line, a good surface finish is achieved together with good rates of metal removal.

Due to the avoidance of inserts in at least one embodiment, openings as small as 3-5 mm can be machined, which is not possible when using screw-on inserts. The cutting or milling head is an integral unit with no inserts.

In addition the distance between the axis of the milling or cutting tool and the axis about which the milling tool revolves can be adjusted to permit machining of larger or smaller holes having a constant diameter, or machining of holes having a changing diameter, such as a taper. This adjustment, in at least one possible embodiment, could be accomplished using a CNC machine to move the milling tool accordingly with respect to the workpiece being cut. In another possible embodiment, the milling tool could possibly be connected to or held in the tool holder or spindle by an adjustable arrangement, such as a gearing system, adjustment arm, or adjustment slot, which would permit the adjustment of the spacing between the axis of the milling tool and the central longitudinal axis of the tool holder. In another possible embodiment, the milling tool is held in a stationary position and the workpiece is moved with respect to the tool.

According to at least one possible embodiment, the milling tool operates to cut a hole in a workpiece. First, the milling tool is advanced substantially axially into the workpiece and the rough cutting edges located about or on the end of the head of the milling tool initially cut and remove material from the workpiece. At substantially the same time, the milling tool is revolving about another axis, such as the central axis of the hole being cut. As the milling tool is advanced further into the workpiece, the semi-finishing edges, which are located behind the rough cutting edges axially along the direction of advancement of the milling tool, i.e. a distance from the end of milling tool, engage the workpiece to remove further material from the sides of the hole. The semi-finishing edges, as the name implies, are designed to cut a surface that is more finished than that cut by the rough cutting edges, but less finished than that cut by the finishing edges. As the milling tool is advanced even further into the workpiece, the finishing edges, which are located behind the semi-finishing edges axially along the direction of advancement of the milling tool, i.e. further from the end of milling tool than the semi-finishing edges, engage the workpiece to remove further material from the sides of the hole. The finishing edges, as the name implies, are designed to cut a surface that is more finished than that cut by both the rough cutting edges and the semi-finishing edges. The finishing edges are located at the outermost periphery or at the greatest diameter of the milling head and thus determine the final size of the hole and the finish of the interior surface of the hole. Once the milling tool has been advanced far enough that the finishing edges are engaged with the workpiece, all edges are working simultaneously to cut the hole. The rough edges are utilized to remove most of the material from the hole, while the semi-finishing and finishing edges remove less material but finish the interior surface of the hole.

Such a milling tool and cutting process could be used to cut through holes or bore holes and blind holes, especially if the finish of the bottom of the blind hole is of little to no concern. To further explain, the curved or rounded design of the milling tool, as well as the location of the rough cutting edges, semi-finishing edges, and the finishing edges, results in a blind hole which has finished interior side surfaces of the hole, but has a rough, partially curved bottom surface. If it is not a requirement that the blind hole have a totally flat or other finished bottom surface, then the milling tool is suitable for milling blind holes.

Developments of at least one possible embodiment of the present application are described herein.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application is explained in greater detail below illustrated in the accompanying drawings, in which.

DESCRIPTION OF EMBODIMENT OR EMBODIMENTS

Figure 1:
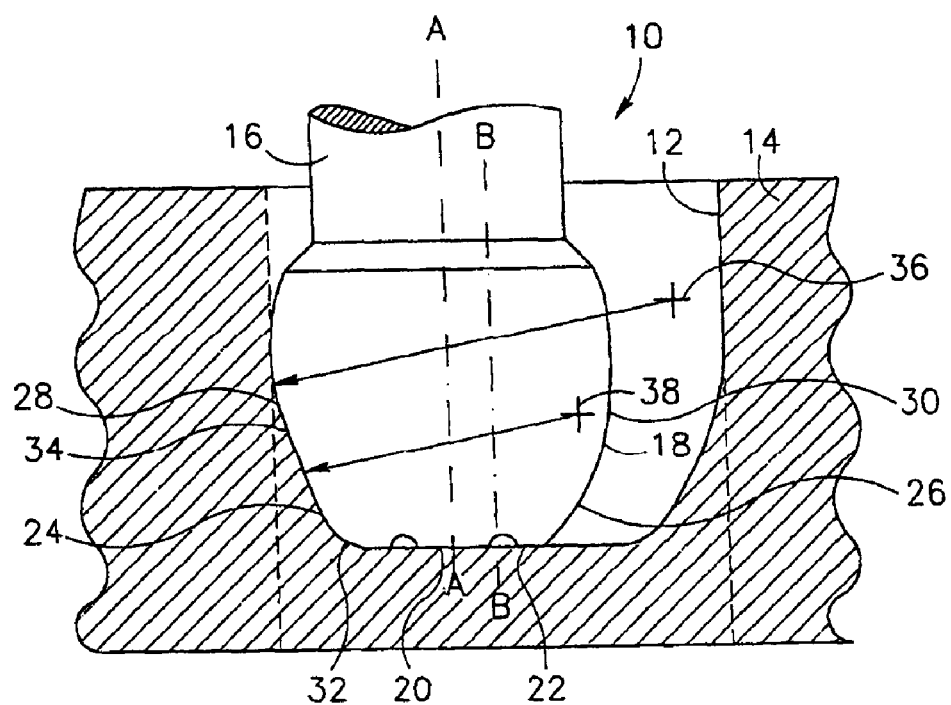
FIG. 1 is a part-sectional elevation of a first embodiment of the end mill tool, seen milling a circular cylindrical recess.

There is seen in FIG. 1 an orbital milling tool 10 for machining the sides of a circular-section opening 12 in a solid material 14 such as metal, wood, and plastic or in components made thereof. The opening 12 seen in the figure is a normal cylindrical through hole, being machined by the tool 10. As is evident in the diagram, a blind hole could also be produced, if the deeper portion of the hole could have a substantially tapered end.

The tool 10 has a shank portion 16 adjoining a cutting portion 18. The axis AA of the cutting portion 18 is spaced apart from the spindle axis BB of a machine tool, not shown, in which the shank 16 is gripped. For the machining of the parallel sided opening 12 the distance between AA and BB can be set and locked. Machining is done when the machine tool drives the tool in a circular orbit about axis BB while feeding the tool downwards.

The profile of the cutting portion 18 displays two or more rough cutting edges 20, 22, two or more semi-finishing edges 24, 26 spaced apart from each other 180° and apart from the finishing edges 28, 30 by means of a curved first transition section 32. A second curved transition section 34 joins the finishing edges 28, 30 to the semi-finishing cutting edges 24, 26.

Each section 20-30 has an optimum tooth shape for its task. As is evident from the figure, the maximum diameter of the semi-finishing edges is larger than the roughing cutting edges and smaller than the finishing edges.

The locus 36 of the radius of curvature for the finishing section 28, 30 is seen outside the end mill profile. However the locus 38 of the radius of curvature for the semi-finishing section 24, 26 is located inside the end mill profile. In the embodiment shown, the transition sections 32, 34 are curved.

A chip-breaker (not shown), useful during the machining of ductile materials such as copper, mild steel and aluminum, can be optionally provided.

With reference to the rest of the figures, similar reference numerals have been used to identify similar parts.

Figure 2:
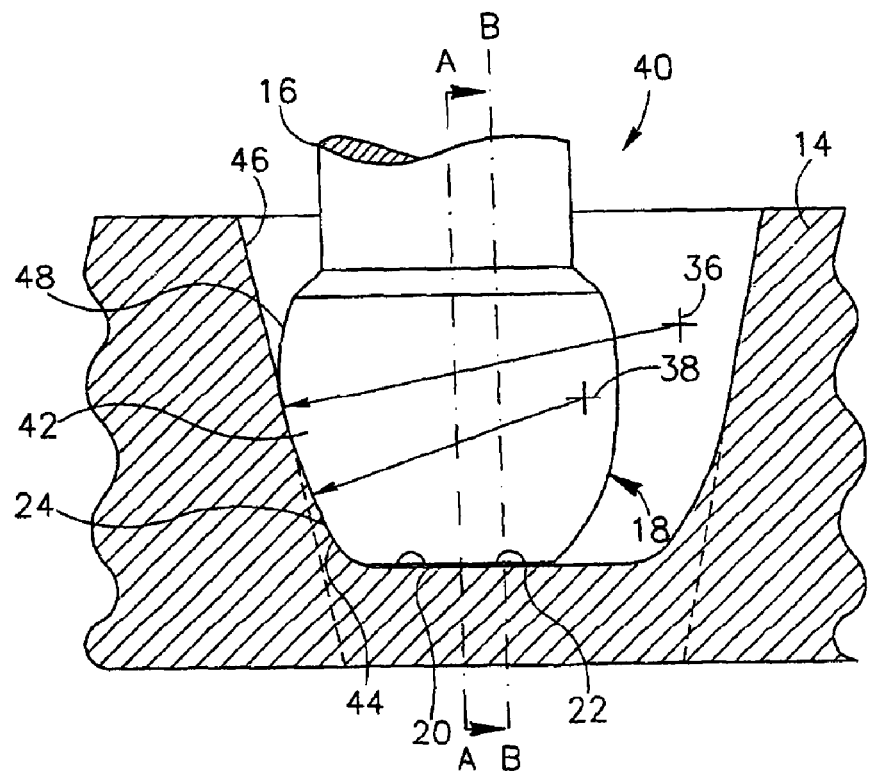
FIG. 2 is a part-sectional elevation of a second embodiment of the end mill tool seen milling a circular-section taper.

Referring now to FIG. 2, there is seen an end mill tool 40 generally similar to the tool 10 seen in FIG. 1. The tool 40 has transition sections 42, 44 which are straight. The tool 40 is seen machining a tapered hole 46. The minimum possible diameter at the narrow end of the tapered hole 46 being machined corresponds to the maximum diameter of the finishing section 48 of the tool 40. During machining operation, a CNC milling machine (not shown) gradually drives the tool holder (not seen) so as to bring the axis AA of the tool 40 nearer the machine spindle axis BB to the tool 10 seen in FIG. 1. The tool 50 is seen being used to cut a recess having both a top taper 52 and a bottom taper 54.

In the present embodiment the length of the second transition section 42 is zero or near zero. This is achieved by slight adjustment of the radii locus 36, 38.

Figure 4:
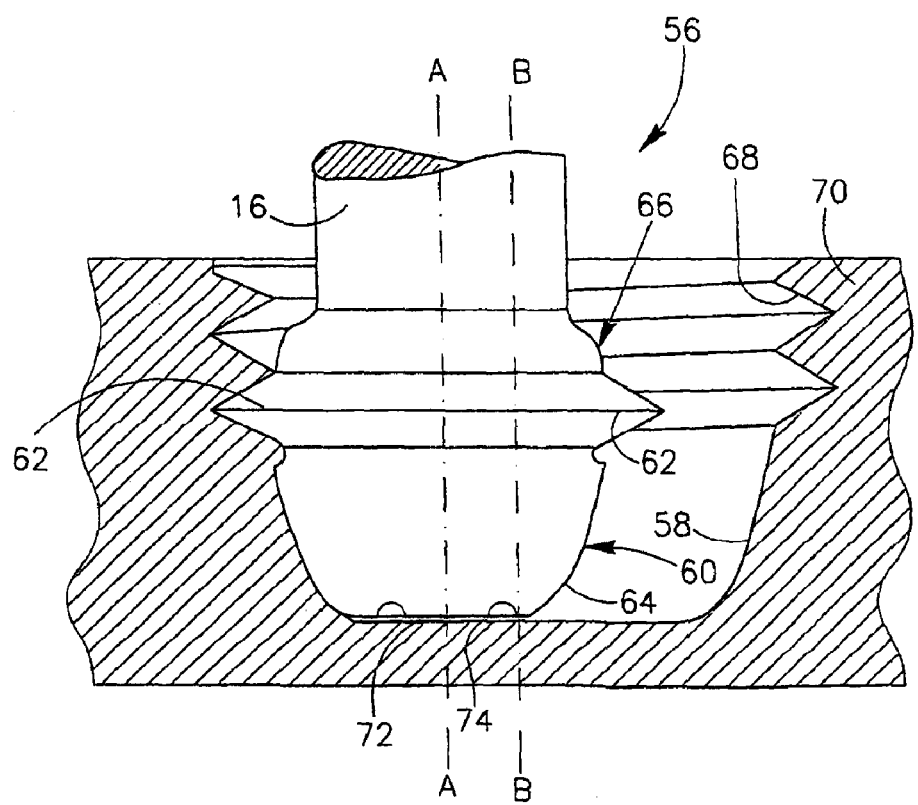
FIG. 4 is a part-sectional elevation of an embodiment of the end mill tool, shown milling a recess and simultaneously cutting a female screw thread therein.

Seen in FIG. 4 is a special purpose end mill tool 56 configured for thread milling. The lower portion 60 of the tool 56 is similar to that seen in FIG. 1. A V-shaped tooth 62 projects from the upper part 66 of the cutting portion and cuts a female screw thread 68 at the same time as the recess 58 is being machined by the roughing teeth 72, 74 and the semi-finishing portion 64 of the tool. As the grooves of the screw thread 68 follow a helical path the head of the CNC milling machine is slanted in relation to the work piece 70. The slant is not seen in the diagram as the direction thereof is in the Z axis.

Figure 3:
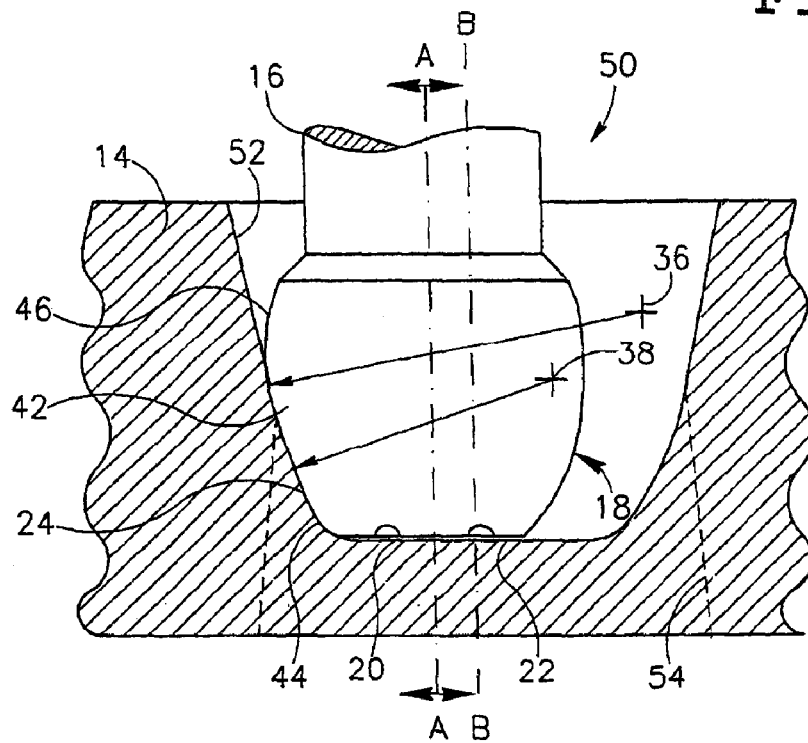
FIG. 3 is a part-sectional elevation of a third embodiment of the end mill tool shown milling a circular-section double taper recess.

In at least one embodiment, the axis BB is the central longitudinal axis of the hole. The axis AA is the central rotational axis of the shank 16 or milling head 18 of the milling tool 10. In operation, the milling head 18 rotates about the axis AA while the entire milling tool 10 is moved or revolved about the axis BB in an orbital movement or generally orbital movement. Axis AA is maintained at a constant radial distance from axis BB to permit the machining of a circular hole. As shown in the other embodiments herein, the distance between the axes AA and BB can be adjusted. For example, to cut another circular hole with a constant diameter, which hole may have a smaller or larger diameter than a hole cut previously by the milling tool, the distance between axes AA and BB could be decreased or increased accordingly and fixed for the entire cutting process. To cut holes with at least one tapered surface, such as shown in FIGS. 2-4, the distance between the axes can be adjusted throughout the milling process to either increase or decrease the diameter of the portion of the hole being cut to create a tapered surface.

Figure 5:
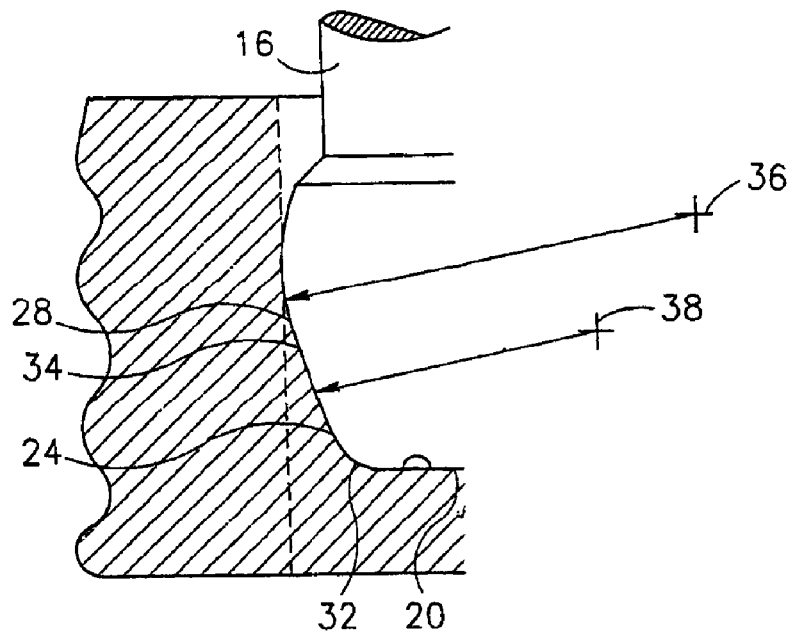
FIG. 5 shows one half of an embodiment of a milling tool having some features similar to the embodiment shown in FIG. 1.

FIG. 5 shows one half of an embodiment of a milling tool having some features similar to the embodiment shown in FIG. 1. For purposes of simplicity, only one half of the milling tool is shown since the other half not shown is a mirror image of the first half, and thus would not include any additional features that would need to be shown for an understanding of the embodiment.

Figure 6:
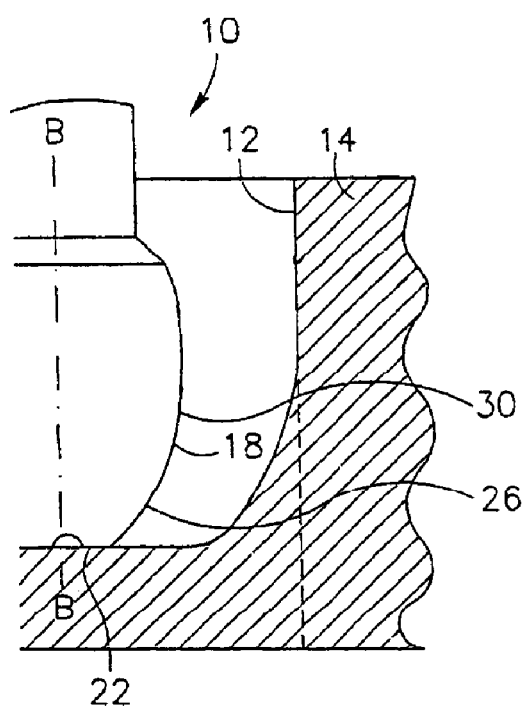
FIG. 6 shows one half of an embodiment of a milling tool having some features similar to the embodiment shown in FIG. 1.

FIG. 6 shows one half of an embodiment of a milling tool having some features similar to the embodiment shown in FIG. 1. For purposes of simplicity, only one half of the milling tool is shown since the other half not shown is a mirror image of the first half, and thus would not include any additional features that would need to be shown for an understanding of the embodiment.

Figure 7:
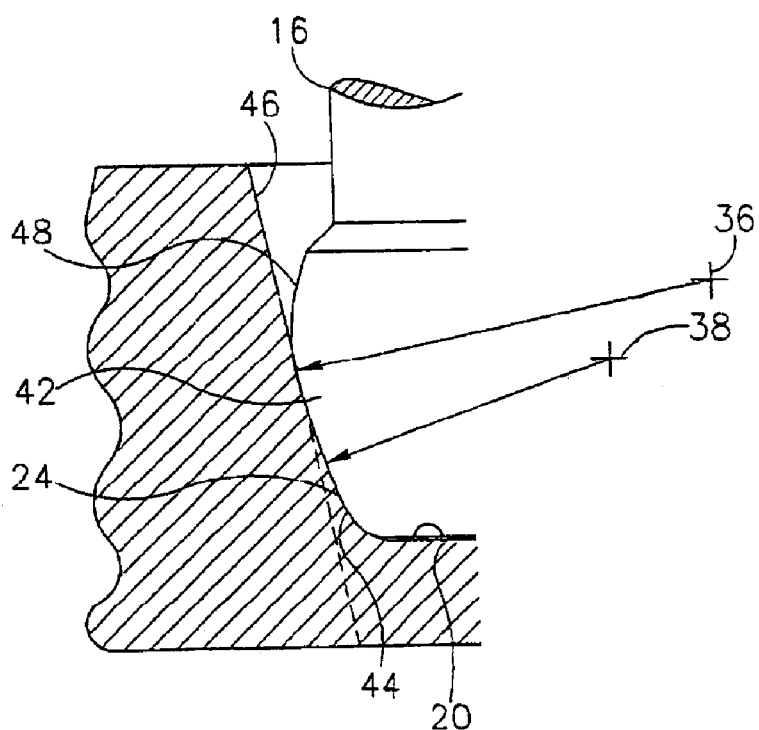
FIG. 7 shows one half of an embodiment of a milling tool having some features similar to the embodiment shown in FIG. 2.

FIG. 7 shows one half of an embodiment of a milling tool having some features similar to the embodiment shown in FIG. 2. For purposes of simplicity, only one half of the milling tool is shown since the other half not shown is a mirror image of the first half, and thus would not include any additional features that would need to be shown for an understanding of the embodiment.

Figure 8:
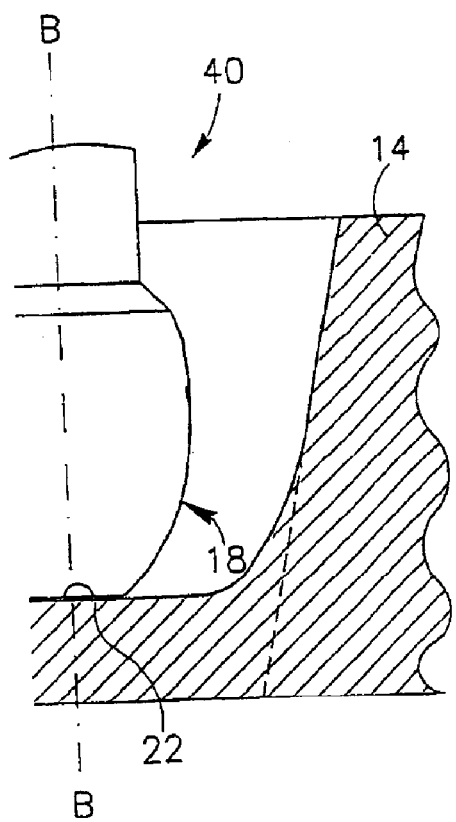
FIG. 8 shows one half of an embodiment of a milling tool having some features similar to the embodiment shown in FIG. 2.

FIG. 8 shows one half of an embodiment of a milling tool having some features similar to the embodiment shown in FIG. 2. For purposes of simplicity, only one half of the milling tool is shown since the other half not shown is a mirror image of the first half, and thus would not include any additional features that would need to be shown for an understanding of the embodiment.

Figure 9:
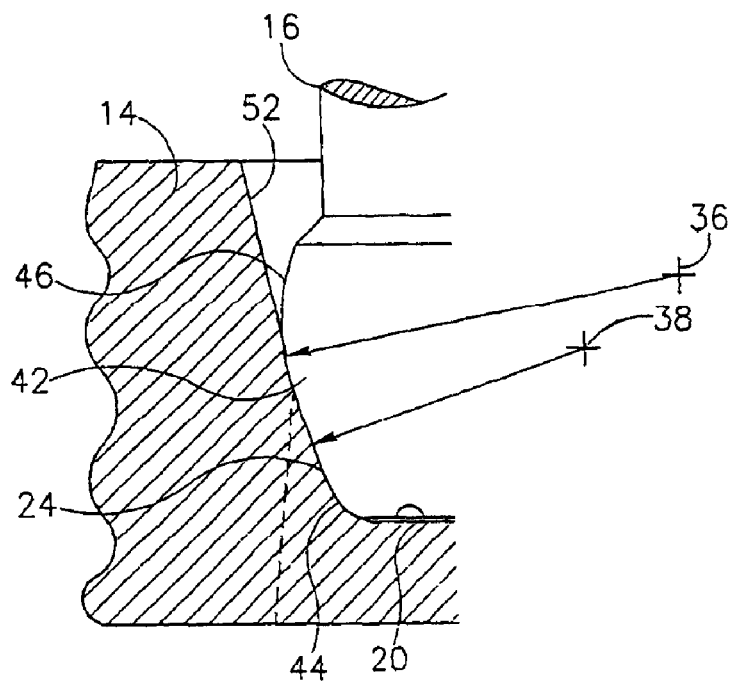
FIG. 9 shows one half of an embodiment of a milling tool having some features similar to the embodiment shown in FIG. 3.

FIG. 9 shows one half of an embodiment of a milling tool having some features similar to the embodiment shown in FIG. 3. For purposes of simplicity, only one half of the milling tool is shown since the other half not shown is a mirror image of the first half, and thus would not include any additional features that would need to be shown for an understanding of the embodiment.

Figure 10:
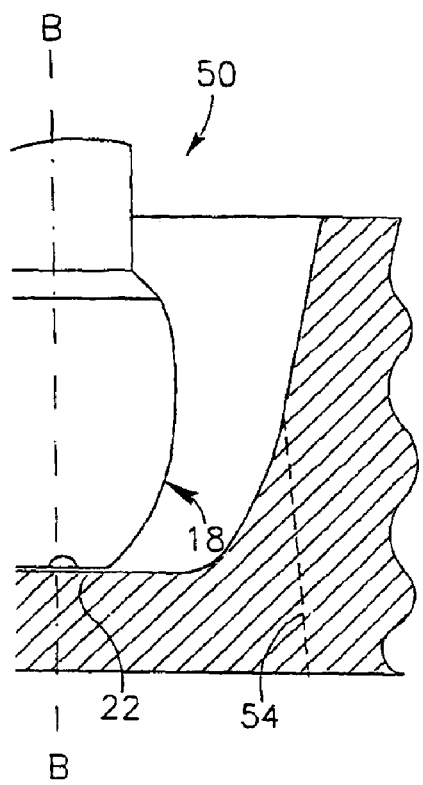
FIG. 10 shows one half of an embodiment of a milling tool having some features similar to the embodiment shown in FIG. 3.

FIG. 10 shows one half of an embodiment of a milling tool having some features similar to the embodiment shown in FIG. 3. For purposes of simplicity, only one half of the milling tool is shown since the other half not shown is a mirror image of the first half, and thus would not include any additional features that would need to be shown for an understanding of the embodiment.

Figure 11:
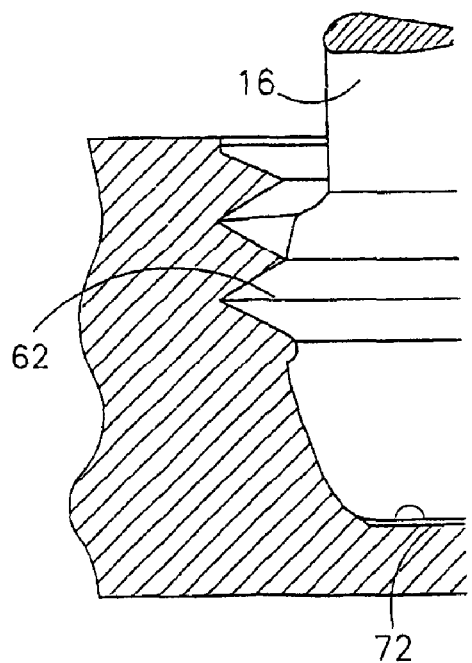
FIG. 11 shows one half of an embodiment of a milling tool having some features similar to the embodiment shown in FIG. 4.

FIG. 11 shows one half of an embodiment of a milling tool having some features similar to the embodiment shown in FIG. 4. For purposes of simplicity, only one half of the milling tool is shown since the other half not shown is a mirror image of the first half, and thus would not include any additional features that would need to be shown for an understanding of the embodiment.

Figure 12:
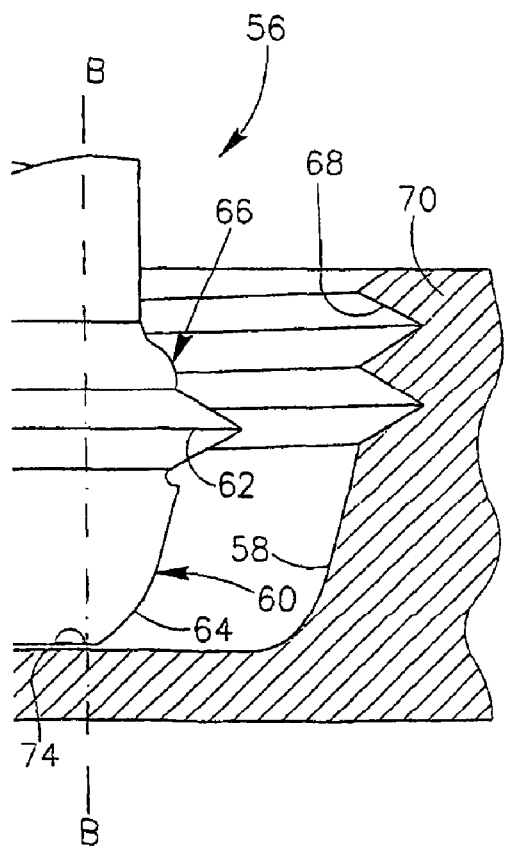
FIG. 12 shows one half of an embodiment of a milling tool having some features similar to the embodiment shown in FIG. 4.

FIG. 12 shows one half of an embodiment of a milling tool having some features similar to the embodiment shown in FIG. 4. For purposes of simplicity, only one half of the milling tool is shown since the other half not shown is a mirror image of the first half, and thus would not include any additional features that would need to be shown for an understanding of the embodiment.

Figure 13:
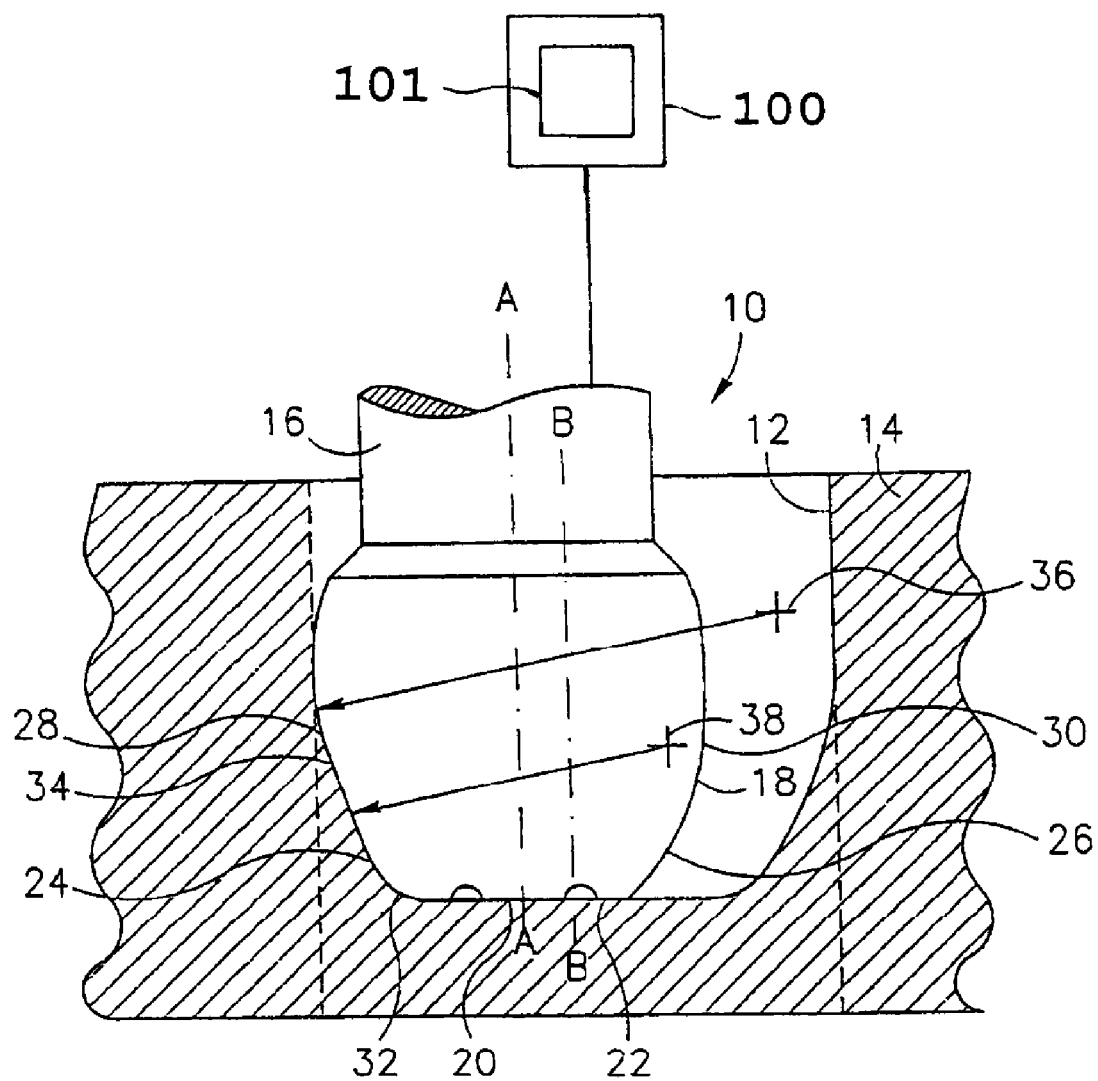
FIG. 13 shows an embodiment of an orbital milling Machine with a milling tool.

FIG. 13 shows an embodiment of an orbital milling machine with a milling tool. The orbital milling machine has a tool holder 100 which has a drive mechanism 101. The tool holder 100 holds the milling tool therein by the shank portion of the milling tool. The drive mechanism 101 supplies rotational force to rotate the milling tool about the central rotational axis of the milling tool. As discussed above, the tool holder 100, in at least one possible embodiment, may be movable in an orbital path or a generally orbital path about the center axis of a hole being cut in order to move the milling tool in an orbital path to cut a hole larger than the greatest diameter of the milling tool. The tool holder 100 could also remain stationary and the workpiece could be moved with respect to it. Finally, the tool holder 100 could have an adjustment mechanism to allow the displacement of the milling tool in the tool holder 100 such that they are no longer coaxial, but rather the rotational axis of the milling tool would be offset a distance from the center or central rotational axis of the tool holder 100. Regardless of the exact configuration, the tool holder 100 is designed to permit orbital milling.

The scope of the present application is intended to include all embodiments coming within the meaning of the following claims. The foregoing examples illustrate useful embodiments of the present application, but are not to be considered as limiting its scope, as those skilled in the art will be aware that additional variants and modifications of the present application can readily be formulated without departing from the meaning of the following claims.

The present application relates to tools for the machining of solid materials. Additionally, the present application relates to an improved end-mill for use in orbital milling of recesses.

One feature or aspect of an embodiment is believed at the time of the filing of this patent application to possibly reside broadly in an orbital milling tool for cutting openings in a solid material, wherein said openings include normal cylindrical through holes, blind holes, holes including recesses, screw threaded holes, and tapered holes, said tool having a shank portion adjoining a cutting portion, the axis of said cutting portion being spaced apart from the spindle axis of a machine tool in which said shank is to be held, said cutting portion having at least one roughing cutting edges, a plurality of semi-finishing edges axially spaced apart by means of a first transition section from said roughing cutting edges and a plurality of finishing edges axially spaced apart by means of a second transition section from said semi-finishing cutting edges, the maximum diameter of said semi-finishing edges being larger than said roughing cutting edges and smaller than said finishing edges.

Another feature or aspect of an embodiment is believed at the time of the filing of this patent application to possibly reside broadly in the orbital milling tool, wherein said transition sections are straight.

Yet another feature or aspect of an embodiment is believed at the time of the filing of this patent application to possibly reside broadly in the orbital milling tool, wherein said transition sections are curved.

Still another feature or aspect of an embodiment is believed at the time of the filing of this patent application to possibly reside broadly in the orbital milling tool, wherein the length of said second transition section is zero.

A further feature or aspect of an embodiment is believed at the time of the filing of this patent application to possibly reside broadly in the orbital milling tool including a chipbreaker.

Another feature or aspect of an embodiment is believed at the time of the filing of this patent application to possibly reside broadly in the orbital milling tool, wherein said cutting portion has a single flute.

Yet another feature or aspect of an embodiment is believed at the time of the filing of this patent application to possibly reside broadly in the orbital milling tool, wherein said cutting portion has a plurality of flutes.

Still another feature or aspect of an embodiment is believed at the time of the filing of this patent application to possibly reside broadly in an orbital milling tool substantially as described hereinbefore and with reference to the accompanying drawings.

A further feature or aspect of an embodiment is believed at the time of the filing of this patent application to possibly reside broadly in a method of orbital milling using an orbital milling machine for cutting openings in a workpiece, said machine comprising: a tool holder being configured and disposed to receive and hold a milling tool therein; a milling tool comprising a shank portion and a cutting portion and having a central rotational axis; said milling tool being held in said tool holder by said shank portion; said tool holder comprising a drive mechanism to rotate said milling tool about said central rotational axis; said central rotational axis of said milling tool being spaced a distance from a second axis, said second axis being one of: a central axis of said tool holder and a central axis of a hole being cut by said milling tool to permit orbital milling; said cutting portion having a first end joined with said shank portion and a second end disposed opposite said first end; and said cutting portion comprising: at least one roughing cutting edge disposed at said second end; a plurality of finishing edges disposed adjacent said first end; a plurality of semi-finishing edges disposed between said at least one roughing cutting edge and said finishing edges; said at least one roughing edge and said semi-finishing edges being connected and axially spaced apart by a first transition section; said semi-finishing edges and said finishing edges being connected and axially spaced apart by a second transition section; and the maximum diameter of said cutting tool at said semi-finishing edges being larger than the diameter of said cutting tool at said roughing cutting edges and smaller than the diameter of said cutting tool at said finishing edges; said method comprising the steps of: advancing said milling tool substantially axially into a workpiece to cut an opening therein; cutting the workpiece with said at least one rough cutting edge, and substantially simultaneously revolving said milling tool about the second axis in an orbital path; advancing said milling tool substantially axially further into the workpiece; cutting the workpiece with said at least one rough cutting edge and said semi-finishing cutting edges, and substantially simultaneously revolving said milling tool about the second axis in an orbital path; advancing said milling tool substantially axially yet further into the workpiece; cutting the workpiece with said at least one rough cutting edge and said semi-finishing cutting edges, and substantially simultaneously cutting and finishing the interior side surfaces of the opening with said finishing cutting edges, and substantially simultaneously revolving said milling tool about the second axis in an orbital path; and one of (A) and (B): (A) continuing advancing, cutting, and finishing until said milling tool protrudes out an opposite side of the workpiece to form a finished through hole, then withdrawing said milling tool out of the workpiece; and (B) continuing advancing, cutting, and finishing until said milling tool reaches a desired depth in the workpiece to form a blind opening in the workpiece, which blind opening has finished side surfaces and a substantially unfinished bottom surface, then withdrawing said milling tool out of the workpiece.

Another feature or aspect of an embodiment is believed at the time of the filing of this patent application to possibly reside broadly in an orbital milling machine for cutting openings in a workpiece, said machine comprising: a tool holder being configured and disposed to receive and hold a milling tool therein; a milling tool comprising a shank portion and a cutting portion and having a central rotational axis; said milling tool being held in said tool holder by said shank portion; said tool holder comprising a drive mechanism to rotate said milling tool about said central rotational axis; said central rotational axis of said milling tool being spaced a distance from a second axis, said second axis being one of: a central axis of said tool holder and a central axis of a hole being cut by said milling tool to permit orbital milling; said cutting portion having a first end joined with said shank portion and a second end disposed opposite said first end; and said cutting portion comprising: at least one roughing cutting edge disposed at said second end; a plurality of finishing edges disposed adjacent said first end; a plurality of semi-finishing edges disposed between said at least one roughing cutting edge and said finishing edges; said at least one roughing edge and said semi-finishing edges being connected and axially spaced apart by a first transition section; said semi-finishing edges and said finishing edges being connected and axially spaced apart by a second transition section; and the maximum diameter of said cutting tool at said semi-finishing edges being larger than the diameter of said cutting tool at said roughing cutting edges and smaller than the diameter of said cutting tool at said finishing edges.

Yet another feature or aspect of an embodiment is believed at the time of the filing of this patent application to possibly reside broadly in a method of orbital milling, wherein said milling tool is an integral, one-piece milling tool.

Still another feature or aspect of an embodiment is believed at the time of the filing of this patent application to possibly reside broadly in a method of orbital milling, wherein said step of cutting and finishing an opening in the workpiece comprises cutting and finishing an opening with a 3-5 mm diameter.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of milling machines, orbital milling machines, and corkscrew milling machines and components thereof, which may possibly be utilized or adapted for use in at least one possible embodiment, are as follows: WP4300 Orbital Milling Machine manufactured by Mirage Machines, 20/21 The Parker Centre, Mansfield Road, Derby DE21 4SZ, United Kingdom; VMC milling machines manufactured by Haas Automation Inc., 2800 Sturgis Rd., Oxnard, Calif. 93030; and Fadal vertical CNC mill manufactured by Fadal Machining Centers, LLC, 20701 Plummer St., Chatsworth, Calif. 91311. The published brochures for these machines are hereby incorporated by reference herein.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign and international patent publication applications, namely, Israel Patent Application No. 167779, filed on Mar. 31, 2005, having inventor Vladimir VOLOKH, and International Application No. PCT/IL2006/000299, filed on Mar. 5, 2006, having WIPO Publication No. WO2006/103649 A2 and inventor Vladimir VOLOKH, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in Israel and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of orbital milling using an orbital milling machine for cutting openings in a workpiece, said machine comprising: a tool holder being configured and disposed to receive and hold a milling tool therein; a milling tool comprising a shank portion and a cutting portion and having a central rotational axis; said milling tool being held in said tool holder by said shank portion; said tool holder comprising a drive mechanism to rotate said milling tool about said central rotational axis; said central rotational axis of said milling tool being spaced a distance from a second axis, said second axis being one of: a central axis of said tool holder and a central axis of a hole being cut by said milling tool to permit orbital milling; said cutting portion having a first end joined with said shank portion and a second end disposed opposite said first end; and said cutting portion comprising: at least one roughing cutting edge disposed at said second end; a plurality of finishing edges disposed adjacent said first end; a plurality of semi-finishing edges disposed between said at least one roughing cutting edge and said finishing edges; said at least one roughing edge and said semi-finishing edges being connected and axially spaced apart by a first transition section; said semi-finishing edges and said finishing edges being connected and axially spaced apart by a second transition section; and the maximum diameter of said cutting tool at said semi-finishing edges being larger than the diameter of said cutting tool at said roughing cutting edges and smaller than the diameter of said cutting tool at said finishing edges; said finishing edges each comprising a substantial portion being curved;

said method comprising the steps of:

advancing said milling tool substantially axially into a workpiece to cut an opening therein;

cutting the workpiece with said at least one rough cutting edge, and substantially simultaneously revolving said milling tool about the second axis in an orbital path;

advancing said milling tool substantially axially further into the workpiece;

cutting the workpiece with said at least one rough cutting edge and said semi-finishing cutting edges, and substantially simultaneously revolving said milling tool about the second axis in an orbital path;

advancing said milling tool substantially axially yet further into the workpiece;

cutting the workpiece with said at least one rough cutting edge and said semi-finishing cutting edges, and substantially simultaneously cutting a curved surface in the workpiece with said substantial, curved portion of each of said finishing edges and finishing the interior side surfaces of the opening with said finishing cutting edges, and substantially simultaneously revolving said milling tool about the second axis in an orbital path; and one of (A) and (B):
(A) continuing advancing, cutting, and finishing until said milling tool protrudes out an opposite side of the workpiece to form a finished through hole, then withdrawing said milling tool out of the workpiece; and
(B) continuing advancing, cutting, and finishing until said milling tool reaches a desired depth in the workpiece to form a blind opening in the workpiece, which blind opening has finished side surfaces and a substantially unfinished bottom surface, then withdrawing said milling tool out of the workpiece.

2. An orbital milling machine for cutting openings in a workpiece, said machine comprising:
a tool holder being configured and disposed to receive and hold a milling tool therein;
a milling tool comprising a shank portion and a cutting portion and having a central rotational axis;
said milling tool being held in said tool holder by said shank portion;
said tool holder comprising a drive mechanism to rotate said milling tool about said central rotational axis;
said central rotational axis of said milling tool being spaced a distance from a second axis, said second axis being one of: a central axis of said tool holder and a central axis of a hole being cut by said milling tool to permit orbital milling;
said cutting portion having a first end joined with said shank portion and a second end disposed opposite said first end; and
said cutting portion comprising:
at least one roughing cutting edge disposed at said second end;
a plurality of finishing edges disposed adjacent said first end;
a plurality of semi-finishing edges disposed between said at least one roughing cutting edge and said finishing edges;
said at least one roughing edge and said semi-finishing edges being connected and axially spaced apart by a first transition section;
said semi-finishing edges and said finishing edges being connected and axially spaced apart by a second transition section;
the maximum diameter of said cutting tool at said semi-finishing edges being larger than the diameter of said cutting tool at said roughing cutting edges and smaller than the diameter of said cutting tool at said finishing edges; and
said finishing edges each comprising a substantial portion being curved.

3. An orbital milling tool for cutting openings in a solid material, wherein said openings include normal cylindrical through holes, blind holes, holes including recesses, and tapered holes, said tool having a shank portion adjoining a cutting portion, the axis of said cutting portion being spaced apart from the spindle axis of a machine tool in which said shank is to be held, said cutting portion having at least one roughing cutting edges, a plurality of semi-finishing edges axially spaced apart by means of a first transition section from said roughing cutting edges and a plurality of finishing edges axially spaced apart by means of a second transition section from said semi-finishing cutting edges, the maximum diameter of said semi-finishing edges being larger than said roughing cutting edges and smaller than said finishing edges, said finishing edges each comprising a substantial portion being curved.

4. The orbital milling machine according to claim 3, wherein said transition sections are straight.

5. The orbital milling machine according to claim 3, wherein said transition sections are curved.

6. The orbital milling machine according to claim 3, wherein the length of said second transition section is zero.

7. The orbital milling machine according to claim 3, wherein said cutting portion comprises one of: a single chip flute and a plurality of chip flutes.

8. The orbital milling machine according to claim 2, wherein said semi-finishing edges each comprising a substantial portion being curved.

9. The orbital milling machine according to claim 8, wherein:
said curved portion of each of said finishing edges has a radius of curvature; and
the locus of points of the curve of said curved portion of each of said finishing edges are located a distance from a center of curvature, which distance is greater than the diameter of said cutting tool at said finishing edges.

10. The orbital milling machine according to claim 9, wherein:
said curved portion of each of said semi-finishing edges has a radius of curvature, which radius of curvature is less than the radius of curvature of said finishing edges, and
the locus of points of the curve of said curved portion of each of said semi-finishing edges are located a distance from a center of curvature, which distance is less than the diameter of said cutting tool at said finishing edges.

11. The orbital milling machine according to claim 10, wherein said transition sections are curved.

12. The orbital milling machine according to claim 2, wherein each of said finishing edges is curved over the length thereof.

13. The orbital milling machine according to claim 12, wherein each of said semi-finishing edges is curved over the length thereof.

14. The orbital milling machine according to claim 13, wherein:
said curved portion of each of said finishing edges has a radius of curvature; and
the locus of points of the curve of said curved portion of each of said finishing edges are located a distance from a center of curvature, which distance is greater than the diameter of said cutting tool at said finishing edges.

15. The orbital milling machine according to claim 14, wherein:
said curved portion of each of said semi-finishing edges has a radius of curvature, which radius of curvature is less than the radius of curvature of said finishing edges, and
the locus of points of the curve of said curved portion of each of said semi-finishing edges are located a distance from a center of curvature, which distance is less than the diameter of said cutting tool at said finishing edges.

16. The orbital milling machine according to claim 15, wherein said transition sections are curved.

17. The orbital milling machine according to claim 15, wherein said transition sections are straight.

18. The orbital milling machine according to claim 15, wherein the length of said second transition section is zero.

* * * * *